Patented Feb. 22, 1938

2,109,116

UNITED STATES PATENT OFFICE 2,109,116

DERIVATIVES OF THE ANTHRAPYRIMIDINE SERIES

Max Albert Kunz, Mannheim, and Karl Koeberle, Ludwigshafen-on-the-Rhine, Germany, assignors to General Aniline Works, Inc., New York, N. Y., a corporation of Delaware No Drawing. Application November 23, 1932, Serial No. 644,134. In Great Britain May 18, 1931

5 Claims. (Cl. 260—32)

The present invention relates to new derivatives of the anthrapyrimidine series and a process of producing same.

The present application is a continuation-in-part of application Ser. No. 586,692, filed on January 14th, 1932.

We have found that very valuable derivatives of the anthrapyrimidine series are obtained by substituting the hydrogen and oxygen atoms fixed to the Py-ring of an anthrapyrimidone and which are contained therein as a hydroxyl group when the anthrapyrimidone is in the enolic form, by one of the substituents Cl, Br, I, F, —NH$_2$, —NHR, —NRR$_1$, —OR, —SR, —CN, —N=N—Ac, wherein R and R$_1$ stand for an alkyl or an aryl radicle and Ac is an acyl radicle. The said substitution is effected by treating anthrapyrimidones containing hydrogen fixed to the Py-ring with agents capable of replacing hydroxyl groups by halogen, the halogen in the resulting Py-C-halogenanthrapyrimidines being exchanged for other monovalent radicles if desired. The reaction of anthrapyrimidone itself and phosphorus pentachloride which may be cited as a typical example probably proceeds according to the following formulae

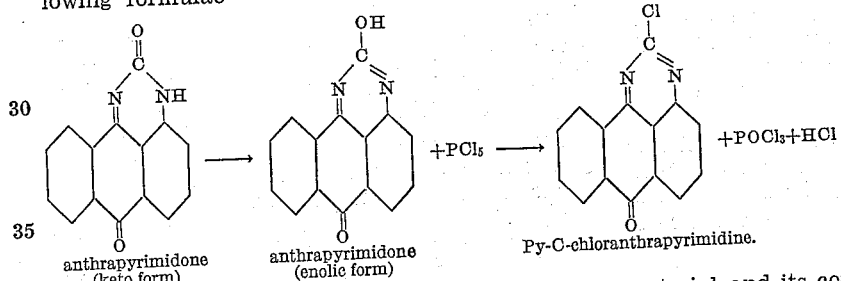

anthrapyrimidone (keto form)    anthrapyrimidone (enolic form)    Py-C-chloranthrapyrimidine.

Probably the reaction proceeds by way of the enolic form of the anthrapyrimidone, i. e. by way of Py-C-hydroxyanthrapyrimidine.

As initial materials, not only anthrapyrimidone itself, but also its substitution products and derivatives containing hydrogen fixed to the Py-ring, as for example amino, especially arylamino, acylamino, nitro, halogen, alkyl, aryl, alkoxy and aryloxy anthrapyrimidones and the corresponding 2.2'-dianthrapyrimidonyls may be employed. If initial materials are used containing hydroxyl or amino groups these groups are preferably protected, for example, by acylation, while acting thereon with agents capable of replacing hydroxyl by halogen, in order to avoid a not completely uniform course of the reaction. The anthrapyrimidones which serve as initial materials can be obtained by acting on the corresponding α-aminoanthraquinones with urea or urethanes.

As suitable agents capable of replacing hydroxyl groups by halogen may be mentioned for example the halides of phosphorus, such as phosphorus pentachloride, phosphorus tribromide and phosphorus trichloride, and also thionyl chloride, benzotrichloride, antimony pentachloride and arsenic pentachloride.

The process may be carried out in the presence or absence of diluents. Suitable diluents are those which are not attacked by the agents capable of replacing oxygen or hydroxyl groups by halogen, as for example benzene and its homologues, such as toluene, xylene, nitro and halogen benzenes, such as mono- and trichlorobenzene, amyl ether, benzyl ether and the like. Usually the most favourable temperatures for carrying out the reaction range between 80° and 140° C. The agents capable of replacing hydroxyl groups by halogen are usually used in a slight excess over the theoretical amount. It may be advantageous to work under decreased pressure; in case of using phosphorus pentachloride the phosphorus oxychloride formed is thus distilled off. In many cases the preparation of the anthrapyrimidone serving as the initial material and its conversion into the Py-C-halogenanthrapyrimidine or into the conversion products obtainable from the Py-C-halogenanthrapyrimidines may be carried out in one operation.

The halogen atom attached to the carbon atom of the pyrimidine ring may be replaced by alkoxy, aryloxy, mercapto, cyano, amino, substituted amino groups or the diazo group. Alkoxy, aryloxy and mercapto groups may be introduced by treating the halogen compound with alcoholates, phenolates and mercaptides. The replacement of the halogen atom by the amino group is effected by means of gaseous liquefied or dissolved ammonia; if substituted ammonia, for example amines containing at least one hydrogen atom fixed to the nitrogen atom, such as monomethylamine, dimethylamine, aniline, methylaniline, naphthylamines, aminoanthraquinones, monomethylaminoanthraquinones, isatine, carbazole, hydrazine, phenylhydrazine, is used, the corresponding anthrapyrimidines substituted on the Py-C-atom are obtained. The substituted Py-C-amino compounds may be converted into the corresponding diazo compounds by the usual methods; the diazo compounds are capable of being further converted according to known methods, for example into bromo, iodo and fluoro compounds. The halogen atom attached to the carbon atom of the pyrimidine ring can be substituted by the cyano group by treatment of the halogen compounds with cuprous cyanide, whereby benzylcyanide is preferably used as a solvent. They may also be employed as intermediate products for the preparation of new dyestuffs.

The reaction products are usually obtained in very good yields and in a good state of purity. When necessary they may be purified by the usual methods, for example by crystallization, boiling with solvents of high boiling point, fractional precipitation from solutions in strong mineral acids, such as sulphuric acid, or by treatment with oxidizing agents, as for example potassium ferricyanide, or alkali hypochlorite.

The anthrapyrimidine derivatives substituted in the Py-C-position which are readily obtained in the manner described above have properties similar to those of other members of the same class of substances obtainable by other methods. For example the acylamino derivatives or imides are valuable vat dyestuffs.

The following examples will further illustrate how the said invention may be carried out in practice, but the invention is not restricted to these examples. The parts are by weight.

*Example 1*

25 parts of 1.9-anthrapyrimidone are heated to from 140° to 150° C. while stirring with 22 parts of phosphorus pentachloride until phosphorus oxychloride no longer escapes. The reaction mixture is then allowed to cool, the reaction product taken up with water, filtered by suction and dried. The resulting Py-C-chlor-1.9-anthrapyrimidine crystallizes in the form of straw-yellow needles which melt at from 250° to 251° C., dissolves in concentrated sulphuric acid giving a golden yellow coloration and yields an orange-red vat.

Thionyl chloride or antimony pentachloride may be employed as the chlorinating agent instead of phosphorus pentachloride. The reaction may also be carried out in the presence of nitrobenzene or the like.

*Example 2*

36.7 parts of 4-benzoylamino-1.9-anthrapyrimidone are heated for several hours while stirring at from 130° to 135° C. in 200 parts of nitrobenzene with 22 parts of phosphorus pentachloride. When the conversion is completed, the reaction mixture is worked up in the usual manner. The reaction product obtained, the analysis of which corresponds to a Py-C-chlor-4-benzoylamino-1.9-anthrapyrimidine, crystallizes in yellow needles having a melting point of 305° C. It dissolves in concentrated sulphuric acid giving a golden-yellow coloration and yields powerful, clear greenish-yellow dyeings of very good fastness from a brown-violet vat.

By condensing the reaction product with alpha- or beta-aminoanthraquinones, new dyestuffs having different shades of color are obtained.

If the 5-benzoylamino-1.9-anthrapyrimidone obtainable from 1-amino-5-benzoylaminoanthraquinone and urea be treated in the manner described in paragraph 1 of this example, a substance is obtained which crystallizes in the form of yellow needles, melts at about 321° C. and yields yellow dyeings.

Instead of 4- or 5-benzoylamino-1.9-anthrapyrimidone, their substitution products, as for example 5-benzoylamino-8-methoxy-1.9-anthrapyrimidone, or 1.4-dibenzoyldiamino-5.10-anthrapyrimidone (obtainable from 5-amino-1.4-dibenzoyldiamino-anthraquinone) or 4-benzoylamino-3-methyl-1.9-anthrapyrimidone (obtainable from 1-amino-4-benzoylamino-3-methylanthraquinone) or acylaminoanthrapyrimidones substituted in the aryl radicle, as for example chlorbenzoylamino, nitrobenzoylamino, alkylbenzoylamino, alkoxybenzoylamino, phenylbenzoylamino or arylamino-anthrapyrimidones may be employed. Furthermore, acyl derivatives of aminoanthrapyrimidones with other acids, as for example with naphthoic acids, benzophenone carboxylic acids, diarylether carboxylic acids such as diphenylether carboxylic acid, diarylsulphide carboxylic acids, such as diphenylsulphide carboxylic acids, carboxylic acids of anthraquinone, benzanthrone, benzanthraquinone, acridone, anthraquinoneacridone, anthraquinonethioxanthrone anthranthrone or allo-ms-naphthodianthrone or with aliphatic or cycloaliphatic carboxylic acids, as for example acetic acid, oxalic acid, succinic acid, hexahydrobenzoic acid, may be subjected to the reaction specified in paragraph 1.

The corresponding Py-C-chloracylaminoanthrapyrimidines may be obtained in an analogous manner from the corresponding 2-, 3-, 6-, 7- or 8-acylaminoanthrapyrimidones.

*Example 3*

26 parts of Py-C-chlor-1.9-anthrapyrimidine (prepared according to Example 1) are boiled for several hours while stirring in 500 parts of nitrobenzene after the addition of 35 parts of 1-amino-5-benzoylaminoanthraquinone. When the conversion is completed, the reaction mixture is worked up in the usual manner. The reaction product obtained is an orange powder which dissolves in concentrated sulphuric acid giving an orange coloration and yields orange shades on cotton from a brown vat.

If, instead of 1-amino-5-benzoylaminoanthraquinone, the equivalent amount of beta-aminoanthraquinone be employed, a reaction product is obtained which dyes cotton yellow shades.

*Example 4*

400 parts of para-chlorbenzoyl-4-amino-1.9-anthrapyrimidone are heated in 4000 parts of nitrobenzene together with 220 parts of phosphorus pentachloride while stirring, at 130° to 135° C., until the reaction mass has become greenish-yellow which is usually the case already after some minutes. The reaction mixture is allowed to cool and worked up as usual. 4-(parachlorbenzoylamino)-Py-C-chlor-1.9-anthrapyrimidine is obtained in the form of yellow needles melting above 330° C., dissolving in concentrated sulphuric acid giving a yellow coloration and giving a violet vat, from which the vegetable fibre is dyed strong clear greenish-yellow shades of excellent fastness properties.

Products giving similar shades may be obtained by treating in an analogous manner the acylamines obtainable from 4-amino-1.9-anthrapyrimidone with metachlorobenzoic acid, 2.4- or 2.5-dichlorbenzoic acid, diphenyl-4-carboxylic quinoline-6-carboxylic acid, naphthalene-β-carboxylic acid, anthraquinone carboxylic acids and the like.

The isomeric acylaminoanthrapyrimidines substituted in the 5- or 8-positions or in the β-position usually yield reaction products giving dyeings of greater depth of color.

Example 5

10 parts of Py-C-chlor-1.9-anthrapyrimidine (prepared according to Example 1) are heated for some hours together with a small amount of copper powder in 150 parts of 20 per cent aqueous ammonia in an autoclave, while stirring, at 150° to 160° C. The reaction mixture is allowed to cool and the reaction product is filtered off and dried. Py-C-amino-1.9-anthrapyrimidine is obtained in an amount corresponding to the theoretical yield. It is a brown orange powder crystallizing in orange needles melting at from 295° to 296° C. The product gives a brown vat and dissolves in concentrated sulphuric acid giving a yellow coloration.

The reaction may be carried out in the absence of diluents or in the presence of diluents different from water.

Instead of copper powder copper compounds may be used as catalysts. The presence of catalysts is, however, not absolutely necessary.

If instead of Py-C-chlor-1.9-anthrapyrimidine substitution products thereof are used as initial materials the corresponding substituted Py-C-amino-1.9-anthrapyrimidines are obtained; for example from Py-C-chlor-4-benzoylamino-1.9-anthrapyrimidine Py-C-amino-4-benzoylamino-1.9-anthrapyrimidine, from Py-C-chlor-5-methoxy-1.9-anthrapyrimidine Py-C-amino-5-methoxy-1.9-anthrapyrimidine are obtained.

By diazotizing Py-C-amino-1.9-anthrapyrimidines the corresponding diazo compounds are obtained which may be further converted, for example by the action of potassium iodide into iodo compounds, by the action of boron trifluoride into fluoro compounds or by the action of cupric cyanide into cyano compounds.

If hydrazine hydrate or phenylhydrazine are used instead of ammonia the corresponding hydrazino compounds are obtained from the Py-C-chlor-1.9-anthrapyrimidines.

Example 6

10 parts of Py-C-chloro-4-benzoylamino-1.9-anthrapyrimidine are heated to boiling for several hours while stirring in 50 parts of aniline together with 1 part of cupric acetate and 3 parts of sodium acetate. The reaction mixture is allowed to cool and the reaction product is filtered off by suction. Py-C-anilino-4-benzoylamino-1.9-anthrapyrimidine thus obtained is a violet powder giving a brown vat from which the vegetable fibre is dyed bluish red shades.

If 10 parts of the initial material used according to the first paragraph of the present example are treated with an aqueous suspension of dimethylamine at 150° C. Py-C-dimethylamino-4-benzoylamino-1.9-anthrapyrimidine is obtained; it crystallizes in long bluish red needles and dyes the vegetable fibre pink shades. By the action of monomethylamine Py-C-methylamino-4-benzoylamino-1.9-anthrapyrimidine is obtained which dyes the vegetable fibre similar shades.

Example 7

77 parts of Py-C-chloro-4-benzoylamino-1.9-anthrapyrimidine are heated to boiling in 1000 parts of nitrobenzene together with 20 parts of cupric oxide, 50 parts of sodium acetate and 50 parts of alpha-aminoanthraquinone for several hours while stirring. The reaction mixture is worked up in the usual manner. The reaction product is a yellow brown powder, dissolves in sulphuric acid giving an orange red coloration, gives a dark brown vat from which the vegetable fibre is dyed red-brown shades of excellent fastness properties.

A reaction product dyeing the vegetable fibre orange shades is obtained when acting with 1-amino-5-benzoylaminoanthraquinone on Py-C-chlor-4-benzoylamino-1.9-anthrapyrimidine in a similar manner as described above; further aminoanthraquinones or amino compounds of vatable diketones different from anthraquinone may be used with a similar effect; for example 5-amino-1.9-anthrapyrimidine yields an imide giving bluish-red dyeings.

Example 8

100 parts of Py-C-chlor-4-benzoylamino-1.9-anthrapyrimidine, 1000 parts of phenol and 100 parts of potassium carbonate are heated to boiling for some hours while stirring. Then the reaction mixture is allowed to cool down to about 100° C. and diluted with 1000 parts of alcohol. The reaction product is filtered off by suction in the cold. 4-amino-Py-C-phenoxy-1.9-anthrapyrimidine is a yellow crystalline powder.

If instead of phenol and potassium carbonate sodium methylate is used the corresponding Py-C-methoxy compound is obtained. Furthermore phenol may be replaced by a solution of thiophenol in naphthalene, potassium carbonate being present as described above; in this case the corresponding thioether is obtained. By condensing Py-C-chlor-1.9-anthrapyrimidine with anthraquinone-1-mercaptan a yellow reaction product containing

Example 9

10 parts of Py-C-chlor-4-benzoylamino-1.9-anthrapyrimidine are heated to boiling while stirring for about 1 hour in 50 parts of benzylcyanide together with 10 parts of cuprous cyanide. The reaction mixture is allowed to cool and worked up as usual. Py-C-cyano-4-benzoylamino-1.9-anthrapyrimidine thus obtained crystallizes in yellow needles giving a brown violet vat from which vegetable fibres are dyed yellow shades.

What we claim is:—

1. Anthrapyrimidines corresponding to the general formula

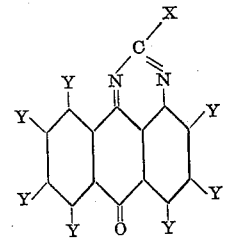

in which X stands for a substituent selected from the group consisting of Cl, Br, I, F, —NHR, —NHR₁, —OR, —SR, —CN, —N=N—Cl, wherein R stands for a radicle of the benzene or anthraquinone series and R₁ stands for an alkyl radicle and up to three of the positions indicated by Y may be substituted by a substituent selected from the group consisting of halogen, the alkyl, aryl, alkoxy, aryloxy, amino, acylamino and nitro groups at least one position marked Y being substituted by an acylamino group.

2. Anthrapyrimidines corresponding to the formula

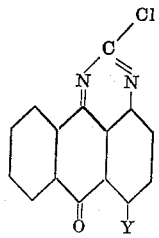

wherein Y stands for an acylamino radicle or hydrogen.

3. An anthrapyrimidine corresponding to the formula

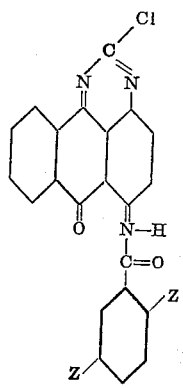

wherein Z may be hydrogen or chlorine.

4. The anthrapyrimidine derivative corresponding to the formula

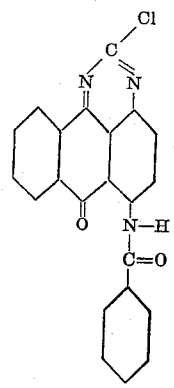

crystallizing in yellow needles, dissolving in concentrated sulphuric acid giving a golden yellow coloration and giving a brown-violet vat from which the vegetable fibre is dyed strong clear greenish yellow shades of excellent fastness properties.

5. The anthrapyrimidine derivative corresponding to the formula

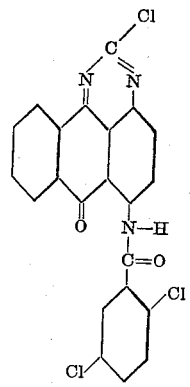

dyeing the vegetable fibre greenish yellow shades of excellent fastness properties.

MAX ALBERT KUNZ.
KARL KOEBERLE.